(12) United States Patent
Keicher et al.

(10) Patent No.: US 10,958,070 B2
(45) Date of Patent: Mar. 23, 2021

(54) INTEGRATED POWER SYSTEM

(71) Applicant: Alion Science and Technology Corporation, McLean, VA (US)

(72) Inventors: Craig A Keicher, Chittenango, NY (US); Michael J Harlow, Parish, NY (US); Benjamin Craig, Ada, MI (US)

(73) Assignee: Alion Science and Technology Corporation, McLean, VA (US)

( * ) Notice: Subject to any disclaimer, the term of this patent is extended or adjusted under 35 U.S.C. 154(b) by 305 days.

(21) Appl. No.: 16/150,868

(22) Filed: Oct. 3, 2018

(65) Prior Publication Data
US 2020/0109686 A1 Apr. 9, 2020

(51) Int. Cl.
*H02M 1/32* (2007.01)
*H02J 1/10* (2006.01)

(52) U.S. Cl.
CPC .............. *H02J 1/102* (2013.01); *H02M 1/32* (2013.01); *H02J 1/106* (2020.01); *H02M 2001/327* (2013.01)

(58) Field of Classification Search
CPC ............ H02J 1/102; H02J 1/106; H02M 1/32; H02M 2001/327
See application file for complete search history.

(56) References Cited

U.S. PATENT DOCUMENTS

| | | | |
|---|---|---|---|
| 8,848,409 | B2 | 9/2014 | Dujic et al. |
| 2009/0288324 | A1 | 11/2009 | Peterson et al. |
| 2014/0361671 | A1 | 12/2014 | Degner et al. |
| 2016/0165716 | A1 | 6/2016 | Ido et al. |

OTHER PUBLICATIONS

PCT/US18/54173 ISA Search Report dated Nov. 1, 2019.

*Primary Examiner* — Jeremy C Norris
(74) *Attorney, Agent, or Firm* — Fox Rothschild LLP

(57) ABSTRACT

A power system is disclosed that includes a chassis configured to house a first board, a second board, and a third board, in which the boards are electrically coupled to one another. The first board is configured to receive power and to output power at a first voltage and a second voltage. The second board is configured to receive power from the first board or at least one internal battery electrically coupled to the second board and to output power using at least two voltages. The third board is configured to receive power from the second board and to output power at two voltages. The boards include one or more converters configured to convert power. The one or more converters are thermally interfaced with one or more portions of the chassis so as to conduct heat into a respective portion of the chassis.

23 Claims, 6 Drawing Sheets

INTEGRATED POWER SYSTEM

BACKGROUND

A missile guidance set (MGS) for a tube-launched, optically-tracked, wire-guided (TOW) missile system requires a power system to operate. The power system typically includes several components, such as two battery assemblies, a battery charger, a battery charger monitor unit, a battery power conditioner, a vehicle power conditioner, at least two primary batteries, a battery case, and a TVPC, which may weigh over 170 pounds in total. Moreover, the conventional battery assembly utilizes nickel cadmium cell technology.

However, the list of problems with this legacy battery system are every increasing. For example, the system itself is heavy and cumbersome to transport in the field, and when the system is deployed, the nickel cadmium batteries have, in practice, failed to provide the expected number of TOW missile firings. Additionally, charging and discharging the batteries is inefficient as the batteries must be recharged using a nonmobile AC charging unit. If night sight operation is required, the legacy battery system cannot support the night sight, and thus, an additional battery device is required to operate the night sight. Furthermore, the supply of nickel cadmium is diminishing, and one or more component of the conventional battery system are obsolete. Therefore, the cost of replacing one or more of these components is ever increasing.

There is a need to provide an improved battery system to efficiently and cost effectively provide electrical power.

SUMMARY

The present disclosure relates generally to power systems, and more particularly, to integrated power system using improved battery technology and having a higher energy capacity than legacy battery systems.

In one or more embodiments, the disclosed technology relates to a power system including a chassis configured to house a first board, a second board, and a third board, the first board, the second board, and the third board being electrically coupled to one another. In some embodiments, the first board is configured to receive power and to output power at a first voltage and a second voltage. In some embodiments, the second board is configured to receive power from the first board or at least one internal battery electrically coupled to the second board and to output power using at least two voltages. In some embodiments, the third board is configured to receive power from the second board and to output power at two voltages. In some embodiments, each of the first board, the second board, and the third board includes one or more converters configured to convert the received power into the respective output power. In some embodiments, the one or more converters are thermally interfaced with one or more portions of the chassis so as to conduct heat into a respective portion of the chassis.

In some embodiments, the disclosed technology relates to a power system including: a chassis configured to house a first board and a second board, in which the first board and the second board are electrically coupled to one another. In some embodiments, the first board is configured to receive input power and to output power at a first voltage and a second voltage. In some embodiments, the second board is configured to receive power from the first board or at least one internal battery electrically coupled to the second board and to output power using at least two voltages. In some embodiments, each of the first board and the second board includes one or more converters configured to convert the received power into the respective output power. In some embodiments, the one or more converters are thermally interfaced with one or more portions of the chassis so as to conduct heat into a respective portion of the chassis.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE FIGURES

The following drawings are illustrative of particular embodiments of the present disclosure and therefore do not limit the scope of the present disclosure. The drawings are not to scale and are intended for use in conjunction with the explanations in the following detailed description.

DETAILED DESCRIPTION

Figure 1A:
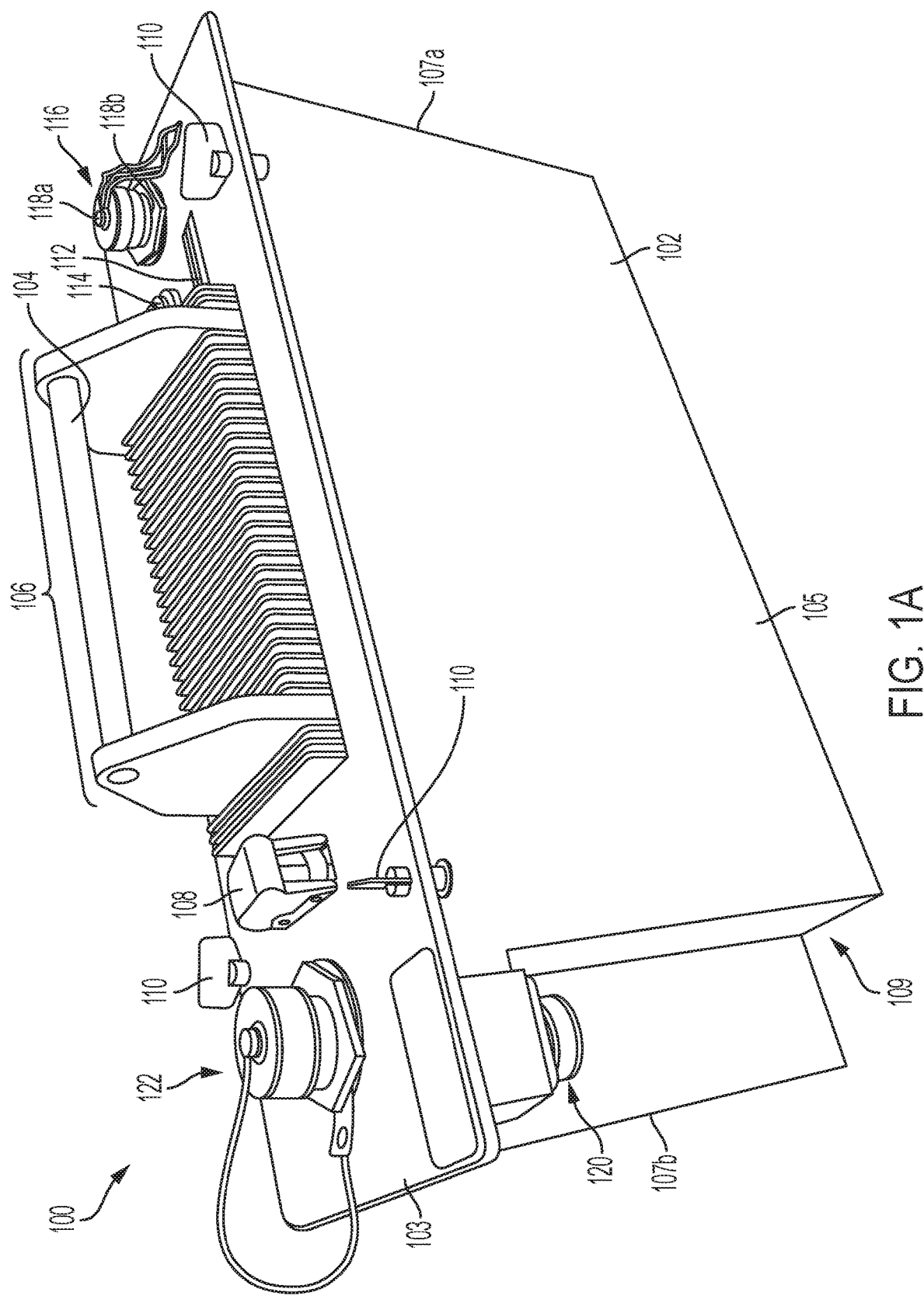
FIG. 1A illustrates a perspective view of an example integrated power system.

The following discussion omits or only briefly describes conventional features of power systems which are apparent to those skilled in the art. It is noted that various embodiments are described in detail with reference to the drawings, in which like reference numerals represent like parts and assemblies throughout the several views. Reference to various embodiments does not limit the scope of the claims attached hereto. Additionally, any examples set forth in this specification are intended to be non-limiting and merely set forth some of the many possible embodiments for the appended claims. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising," when used in this specification, specify the presence of stated features, elements, and/or components, but do not preclude the presence or addition of one or more other features, steps, operations, elements, components, and/or groups thereof.

Embodiments of the present disclosure relate generally to power systems, and more particularly, to integrated power system using improved battery technology and having a higher energy capacity than legacy power systems. Embodiments of the power systems are described below with reference to FIGS. 1A-4.

FIG. 1 illustrates a perspective view of an example integrated power system 100, according to one or more embodiments of the present disclosure.

The integrated power system 100 (hereinafter "system 100") includes a chassis 102 that houses the components of the system 100. The chassis 102 may include a handle 104 connected to a wall, such as the upper wall 103, of the chassis 102. In one or more embodiments, the handle 104 is fixed to the chassis 102. In one or more other embodiments, the handle 104 is fastened to a portion of the upper wall 103 and is rotatable on the chassis 102, such that the handle 104 can move to an up position being perpendicular to the horizontal surface of the upper wall 103 of the chassis 102, or can move to a down position being parallel to the horizontal surface of the upper wall 103 of the chassis 102. In some embodiments, the chassis 102 is made of a metal, such as aluminum. In some embodiments, the chassis 102 is made of a cast alloy, for example cast aluminum A356. The walls of the chassis 102 are configured to thermally conduct and convect heat from the internal components of the chassis 102 to the outside environment. In some embodiments, the system 100 is configured to receive a maximum input at or about 200 W of DC power, and is configured to generate a maximum output at or about 190 W. In some embodiments, the system 100 is configured to produce, at an average efficiency of 88%, which can generate 34 W of heat.

In one or more embodiments, the chassis 102 is configured to receive one or more fasteners 110 on the upper wall 103 of the chassis 102. The one or more fasteners 110 may be positioned to align with fastener receiving portions on a MGS battery receptacle of the MGS. When a user inserts the integrated system 100 into the MGS battery receptacle, the fastener receiving portions may be inserted over the respective one or more fasteners 110. Thereafter, the user may tighten the one or more fasteners 110 to the MGS, thereby securing the system 100 to the MGS. In one or more embodiments, the one or more fasteners 110 can be turnlock fasteners, winged fasteners, screws, or any other type of fastener know to one or ordinary skill in the art. In some embodiments, the turnlock fasteners can be military turnlock fasteners NSN 5325-01-148-8601 or similar.

In one or more embodiments, the system 100 includes an input 122 and at least one of a first interface 120 and a second interface 116. In some embodiments, the input 122 and the second interface 116 are provide on the upper wall 103 of the chassis 102. In some embodiments, the first interface 120 is provided facing away from at least one of the input 122 and the second interface 116. In some embodiments, the rear wall 105 and either the side wall 107a or the side wall 107b form a notched wall portion 109. The notched wall portion 109 may surround at least two sides of the first interface 120, in which the first interface 120 is positioned on one wall of the notched wall portion 109.

In some embodiments, each of the input 122, the first interface 120, and the second interface 116 includes a cap 118a and a terminal 118b. For example, the cap of the input 122 may be cap D38999/33W15N and the corresponding terminal of the input may be D38999/24WD97PN. In another example, the cap 118a for each of the first interface 120 and the second interface 116 may be cap MS3181-12N, and the terminal 118b for the each of the first interface 120 and the second interface 116 may be terminal MS3124E12-10S. In some examples, the cap may be tethered to the terminal, and may include a mounting ring. In other embodiments, each of the input 122, the first interface 120, and the second interface 116 includes only the terminal 118b. The terminals 118b may have one or more pins to receive and to send various signals and/or voltages and currents. The cap 118a is removably connected to the terminal 118b, and is configured to protect the one or more pins of the terminal 118b from being damage by sources, such as dust, water, or impacts from objects, in an environment outside the chassis 102. The terminal 118b may female terminal. In some embodiments, the terminal 118b of each of the input 122, the first interface 120, and the second interface 116 is configured to interface with a cable to either supply or receive power, based on whether the cable is interfaced with the input 122, the first interface 120, or the second interface 116. For example, the terminal of the input 122 is configured to interface with a cable to receive voltage and current from an outside power source. In another example, the terminal of the second interface is configured to interface with a cable to supply voltage and current to a night sight 222. In one or more embodiments, the system 100 weighs 15-25 pounds. In one or more embodiments, the system 100 is configured to interface with a M220 TOW 2 weapon system. In other embodiments, the system 100 is configured to interface with other weapon systems.

In one or more embodiments, the input 122 is a connector configured to receive power from either an alternating current (AC) power source, such as an AC power outlet, and/or direct current (DC) power source, such as an automobile cigarette lighter receptacle. In some embodiments, the AC power, being received from the AC power source, is converted to DC power before entering the system 100. For example, the AC power source may be connected to the input 122 via an AC to DC adapter, in which the AC to DC adapter converts the power from AC power to DC power before entering the system 100. The AC to DC adapter may be, for example, a commercial off the shelf (COTS) AC/DC adapter. The COTS AC/DC adapter is configured to convert 100V-240V of AC power at 50-60 Hz to 24V of conditioned DC power before entering the chassis 102.

In one or more embodiments, the first interface 120 is a connector configured to provide power to the MGS. The first interface 120 may be configured with three outputs each being configured to provide power having different voltages to the MGS. A first output may provide power at or about 24 volts (V). For example, the first output may provide power at 24V having a +/−2.4V line regulation with maximum loads. A second output may provide power at or about a plus 50V. For example, the second output may provide power at plus 50V, and may fluctuate between 48V to 56V with maximum loads. A third output may provide power at or about a minus 50V. For example, the third output may provide power at minus 50V, and may fluctuate between minus 48V to minus 56V with maximum loads. In one or more embodiments, the three outputs of the first interface 120 are configured to provide power at their respective voltages simultaneously. In other embodiments, the three outputs of the first interface 120 are configured to provide power at their respective voltages based on the operations of the MGS.

In one or more embodiments, the second interface 116 is a connector configured to provide power to a night sight. The second interface 116 may be configured with two outputs each being configured to provide power having different voltages to the night sight. A first output may provide power at or about 16.8V. For example, the first output may provide power at 16.8V, and may fluctuate between 17.1V and 16.1V with maximum loads. A second output may provide power at or about 4.8V. For example, the second output may provide power at 4.8V having a +/−0.3V line regulation with maximum loads. In one or more embodiments, the two outputs of the second interface 116 are configured to provide power at their respective voltages simultaneously. In other embodiments, the two outputs of the second interface 116 are configured to provide power at their respective voltages based on the operations of the night sight.

In some embodiments, the system 100 includes a switch 108. The switch 108 may be an ON/OFF switch, for example, a toggle switch. When the switch 108 is turned ON, the switch 108 may be configured to have both the first interface 120 and the second interface 116 provide power at their respective output voltages to the MGS and the night sight, respectively. When the switch 108 is turned OFF, the switch 108 may be configured to have both the first interface 120 and the second interface 116 stop providing power to the MGS and the night sight respectively. In some embodiments, when the input 122 is connected to either an AC or DC outside power source, the system 100 automatically begins to charge the battery packs 124a and 124b of the system 100. The battery packs 124a and 124b may be rechargeable lithium ion batteries. The battery packs 124a and 124b may also be, in a non-limiting example, BB-2590 type batteries each having two 14.4V nominal sections configured in parallel, thereby two charging chips, such as charging chip 226a, 226b, 228a, and 228b, are provided for each battery pack 124a and 124b. The system 100 is configured to charge battery packs 124a and 124b using either AC or DC outside power sources. In some embodiments, the system 100 charges the battery packs 124a and 124b with 100 W or about 100 W. In other embodiments, the system 100 charges the battery packs 124a and 124b at power values based on the design of the system 100. In some embodiments, the system 100 is configured to charge the battery packs 124a and 124b at different rates. For example, the system 100 may be set in a trickle or float charge setting, in which the system 100 charges the battery packs 124a and 124b using a low current value and which stops the charging process when the state of charge for the battery packs 124a and 124b is at full capacity. In another example, the system 100 may be set in a normal charge setting, in which the system 100 charges the battery packs 124a and 124b using a typical current value for charging the battery packs. In yet another example, the system 100 may be set in a fast charge setting, in which the system 100 charges the battery packs 124a and 124b using a high current value. In some examples the charge settings of the system 100 may be set via switch 114.

In some embodiments, the system 100 includes a display 112 and a switch 114. The display 112 may be a state-of-charge display (SOC) to display the status of the system 100. For example, the display 112 may display the amount of power remaining in the one or more battery cells, for example the battery cell 124a and the battery cell 124b, of the system 100, or the display 112 may display the average of the 4 string capacity levels of the charge battery packs 124a and 124b. In another example, the display 122 may the display 112 may display a "no fault" status, which indicates that the system 100 is operating without errors. In other examples, the display 112 may display an indicator that charging of the battery packs 124a and 124b is enabled, an indicator of the internal temperature of the system 100, and/or one or more battery string voltages. In some embodiments, the switch 114 is configured to provide one or more functions of the system 100. For example, if the switch 114 receives a press type input from a user, the display 112 may display the status of the system 100. In another example, if the switch 114 receives a press and hold type input from a user, the display 112 may cycle through various brightness levels for a user to select. In yet another example, if the switch 114 receives a press and hold type input for a predetermined amount of time, such as 15 seconds, from a user, the system 100 may reset.

Figure 1B:
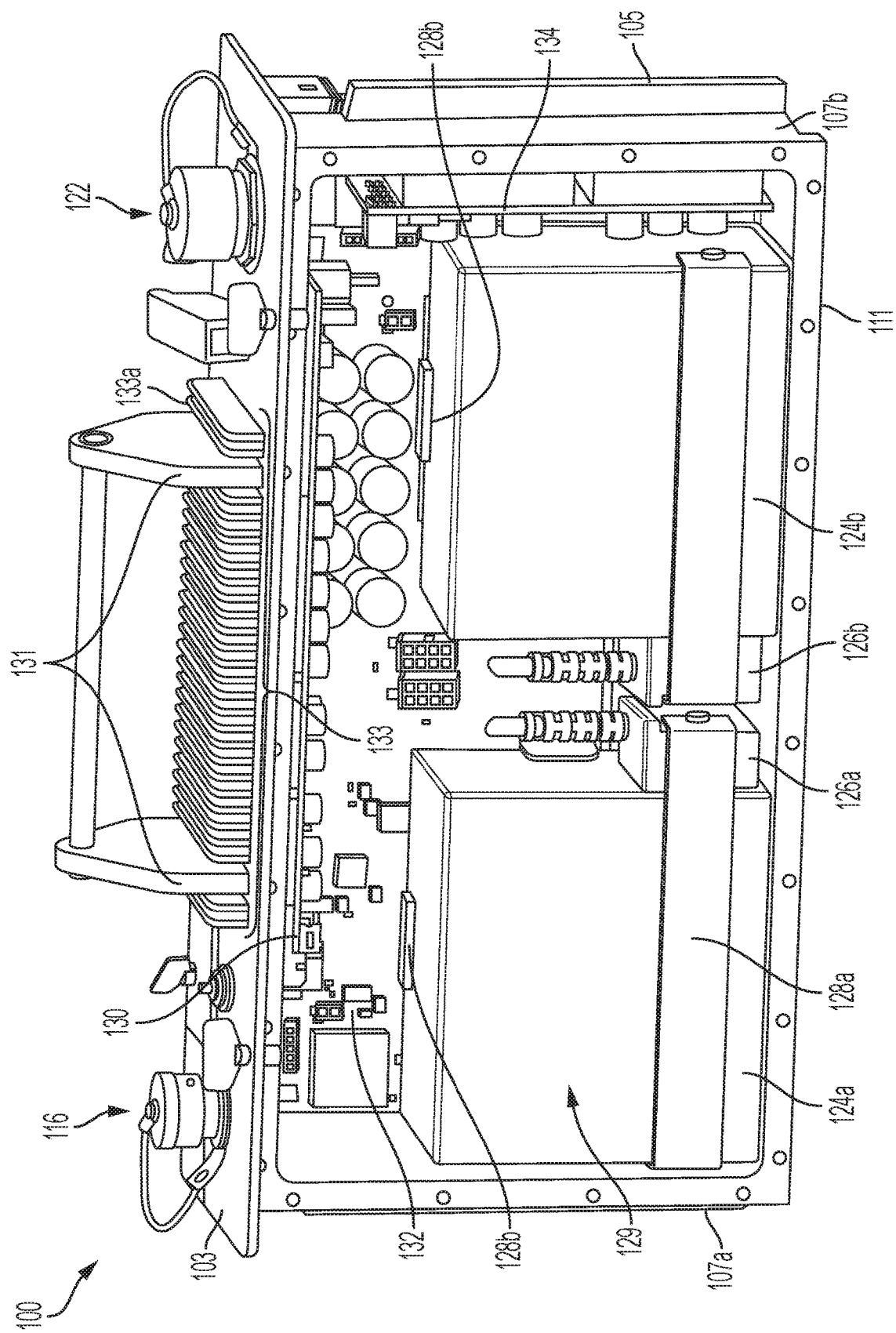
FIG. 1B illustrates a perspective view of an inner portion of the integrated power system of FIG. 1A.
Figure 1C:
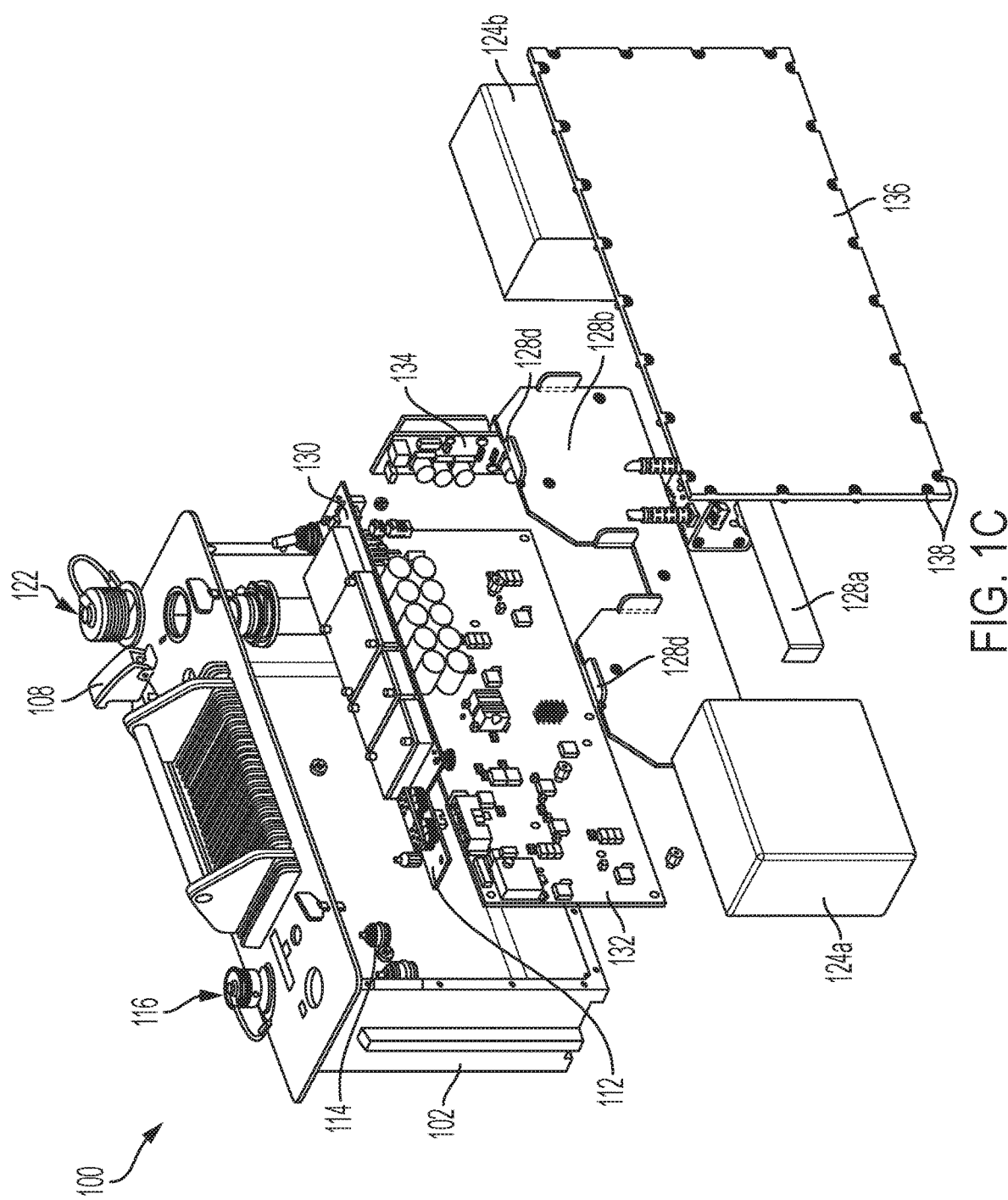
FIG. 1C illustrates a perspective view of the integrated power system of FIG. 1A in an unassembled configuration.

FIG. 1B illustrates a perspective view of an inner portion 129 of the system 100 of FIG. 1A, according to one or more embodiments of the present disclosure. FIG. 1C illustrates a perspective view of the system 100 of FIG. 1A in an unassembled configuration, according to one or more embodiments of the present disclosure.

In some embodiments, the system 100 includes a heat sink 106 on the upper wall 103 of the chassis 102. The heat sink 106 is configured to thermally conduct and convect heat out of the chassis 102, in which the heat may be generated by one or more components within the inner portion 129 of the chassis 102. The heat sink 106 may be positioned near the center of the upper wall 103. In one or more embodiments, the heat sink 106 includes multiple heat sink protrusions 133. In other embodiments, the heat sink 106 includes the multiple heat sink protrusions 133 and handle risers 131. In some embodiments, the multiple heat sink protrusions 133 and the handle risers 131 are casted with the chassis 102, such that the multiple heat sink protrusions 133 and the handle risers 131 are integrally formed with the chassis 102. The handle rises 131 may be connected by a crossbar, in which the handle risers 131 and the cross bar form the handle 104. In some embodiments, the heat sink 106 has an overall size at or about 6.75 inches wide by 3 inches long. In one or more embodiments, when the chassis 102 is inserted into a chassis receptacle of the MGS. The chassis receptacle may cover each wall of the chassis 102, except for the upper wall 103 that is exposed to an outside environment. For example, the upper wall 103 is exposed to moving air. In some embodiments, heat generated by various components of the inner portion 129 travels through the heat sink 106 and out to the outside environment.

Each of the multiple heat sink protrusions 133 extend away from the upper wall 103. A heat sink fin, such as heat sink 133a, may be sized at or about 3 inches long by 0.5 inches high by 0.09 inches thick. The multiple heat sink protrusions 133 may be spaced at or about 0.22 inches on center. In some embodiments, the heat sink 106 includes 27 heat sinks 133a. A set of two heat sinks 133a may be positioned outside of each of the handle risers 131, and the remaining 23 heat sinks 133a may be positioned in between both of the handle risers 131. In one or more embodiments, the heat sink 106 is configured to displace an amount of heat ranging from at or about 6 watts (W) to at or about 42 W, based on whether the night sight and/or MGS is discharging the system 100 or the input 122 is conditioning and converting power to 24V to charge the battery packs 124a and 124b and/or supply power to first interface 120 and/or the second interface.

In one or more embodiments, an access cover 136 forms a removably connected wall of the chassis 102. The access cover 136 may be fastened to the chassis 102 with fasteners 138, such as screws. In some embodiments, the fasteners 138 are captive fasteners, such that the fasteners 138 remain with the access cover 136 when the fasteners 138 are unfastened from the chassis 102. A user may remove the access cover 136 to access the inner portion 129 of the chassis 102. In one or more embodiments, the inner portion 129 of the chassis 102 includes at least one of a first board 130, a second board 132, a third board 134, and one or more battery packs, such as battery pack 124a, and battery pack 124b. The first board 130 may be located on the upper wall 103. The second board 132 may be located on the rear wall 105. The third board 134 may be located on either side wall 107a or side wall 107b. It should be noted that for purposes of discussion, the embodiments discussed herein are discussed in terms of the third board 134 being located on the side wall 107b; however, these features are equally applicable for the cases in which the third board 134 is located on the side wall 107a. The boards may each be fastened to its respective wall via fasteners, such as fasteners from mounting into printed circuit boards.

The battery pack 124a and battery pack 124b may be positioned in front of the second board 132 and the third board 134, and on the lower wall 111 of the chassis 102. A support bracket 128b may be positioned offset on a portion of the second board 132. The support bracket 128b may be fastened to the rear wall 105 via fasteners that extend through the support bracket 128b and the second board 132 and that fasten into the rear wall 105. The support bracket 128b may have one or more battery packs receiving portions 128b configured to separate the battery pack, such as battery pack 124b, from the second board 132. The battery pack receiving portion 128b may include one or more battery pack positioning tabs 128d configured to position the respective battery pack within the chassis 102. The battery pack positioning tabs 128d may be located in at least one of a top edge, a right side edge, and a left side edge of the battery pack receiving portion 128b. The battery pack positioning tabs 128d may be configured to prevent the one or more battery packs from moving within the chassis 102, thereby protecting the first board 130, the second board 132, and/or the third board 134 from being damaged by the one or more battery packs. In one or more embodiments, the battery pack 124a and the battery pack 124b are electrically coupled to the second board 132. The battery connector 126a may connect the second board 132 to the battery pack 124a, and the battery connector 126b connect the second board 132 to the battery pack 124b. A battery strap 128a may surround one or more sides of battery pack 124a and/or one or more sides of battery pack 124b. The battery strap 128a may be configured to prevent the battery connector 126a from disengaging from battery pack 124a and 124b. The battery strap 128a may be positioned between the access cover 136 and the battery pack 124a and 124b preventing the battery strap from detaching from the battery packs. The battery strap 128a may be configured to fasten to each battery connector 126a and 126b that are connected to the battery cell 124a and 124b, respectively, thereby connecting the battery cell 124a and battery cell 124a to the battery strap 128a.

In one or more embodiments, the first board 130 and the second board 132 are electrically coupled to one another, and the second board 132 and the third board 134 are electrically coupled to one another. In one or more embodiments, at least two of the first board 130, the second board 132, and the third board 134 include press-fit connectors, in which one press-fit connector of one board is configured to connect with a press-fit connector of the other board. For example, the first board 130 may include one press-fit connector and the second board 132 may include another press-fit connector configured to receive the press-fit connector of the first board 130. In another example, the first board 130 may include more than one press-fit connector, such as two connectors, configured to mate with the corresponding press-fit connectors, such as another two connectors, on the second board 132. The press-fit connectors of the first board 130 and the second board 132 are configured to be mated together at a right angle. The press-fit connectors may facilitate the transmission of data and electrical signals, such as currents and voltages, from one board to another and vice versa. In one or more other embodiments, at least two of the first board 130, the second board 132, and the third board 134 include other connector systems configured to exchange data and/or electrical signals between at least two boards. For example, the second board 132 and the third board 134 may each have a terminal configured to mate with an end of a wiring harness, in which data and/or electrical signals are exchanged between the second board 132 and the third board 134 via the wires included with the wiring harness.

Figure 2:
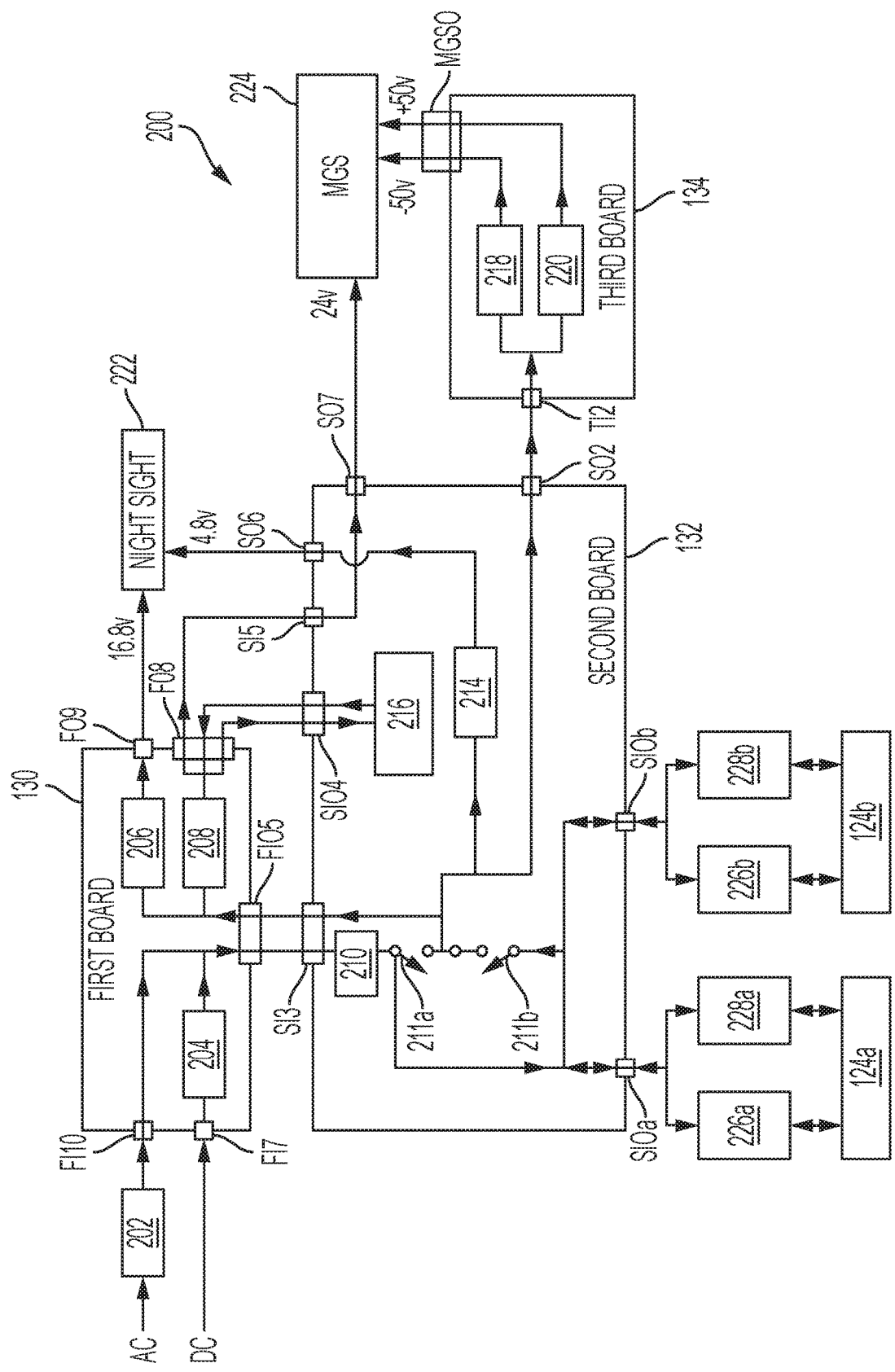
FIG. 2 illustrates an interconnect diagram of the integrated power system of FIG. 1A.

FIG. 2 illustrates an interconnect diagram 200 of the system 100 of FIG. 1A, according to one or more embodiments of the present disclosure.

In one or more embodiments, the first board 130, the second board 132, and the third board 134 include heat producing electrical components. The heat producing electrical components may include at least a 24V DC/24V DC power converter 204, a 24V DC/16.8V DC power converter 206, a 24V DC/24V DC power converter 208, a 24V DC/4.8V DC power converter 214, a 24V DC/50V DC power converter 218, a 24V DC/50V DC power converter 220, at least one charging chip, such as charging chip 226a and charging chip 228a, for the battery pack 124a, and at least one charging chip, such as charging chip 226b and charging chip 228b, for the battery pack 124b. In some embodiments, the heat producing components are positioned on the first board 130, the second board 132, and the third board 134 within the chassis 102 to dissipate heat, generated by the heat producing components, through the heat sink 106 or into a wall of the chassis 102.

In one or more embodiments, the first board 130 includes a 24V DC/24V DC power converter 204, a 24V DC/16.8V DC power converter 206, and a 24V DC/24V DC power converter 208. In some embodiments, the 24V DC/24V DC power converter 204, the 24V DC/16.8V DC power converter 206, and the 24V DC/24V DC power converter 208 may be positioned on the rear surface of the first board 130 facing the heat sink 106. The first board 130 may be configured to be removed and connected to the system 100. By being able to be removed and connected to the system 100, the first board 130 may be easily replaced when one or more electronic components on the first board 130 becomes defective. In other embodiments, the first board 130 may include several removably connected boards, in which the one or more removably connected boards may include various electronic components of the first board 130 and at least one of the 24V DC/24V DC power converter 204, the 24V DC/16.8V DC power converter 206, and the 24V DC/24V DC power converter 208. For example, the first board 130 may include two removably connected boards, in which one removably connected board includes the 24V DC/24V DC power converter 204 and the 24V DC/16.8V DC power converter 206, and in which the other removably connected board includes the 24V DC/24V DC power converter 208. The removably connected boards may be electrically coupled to one another, thereby forming the first board 130. The removably connected boards may be configured to be removed and connected to the system 100. By being able to be removed and connected to the system 100, a power converter may be easily replaced when the power converter becomes defective.

In some embodiments, the 24V DC/24V DC power converter 204, the 24V DC/16.8V DC power converter 206, and the 24V DC/24V DC power converter 208 are configured to be thermally interfaced with the heat sink 106. For example, a baseplate of the DC power converter transfers heat out of the DC power converter through the conductive baseplate and into a portion of the chassis 102, such as the heat sink 106, via a thermal paste or thermal pad. The thermal paste or pad may have at least 5 W/mK thermal conductivity. That is, the heat generated by the 24V DC/24V DC power converter 204, the 24V DC/16.8V DC power converter 206, and the 24V DC/24V DC power converter 208 is directed towards the heat sink 106. In some embodiments, the 24V DC/24V DC power converter 204, the 24V DC/16.8V DC power converter 206, and the 24V DC/24V DC power converter 208 are the heat producing electrical components that have the highest heat producing potential. For example, the 24V DC/24V DC power converter 204, the 24V DC/16.8V DC power converter 206, and the 24V DC/24V DC power converter 208 may produce heat resulting in the highest temperature among the components in the system 100. Additionally, by having the highest heat producing potential, at a full load the 24V DC/24V DC power converter 204, the 24V DC/16.8V DC power converter 206, and the 24V DC/24V DC power converter 208 may produce the greatest amount of heat to be dissipated into the outside environment. In some examples, the 24V DC/24V DC power converter 204, the 24V DC/16.8V DC power converter 206, and the 24V DC/24V DC power converter 208 produce at or about 70% of the total heat generated within the system 100.

In one or more embodiments, the second board 132 includes charging chips 226a, 226b, 228a, and 228b, and 24V DC/4.8V DC power converter 214. In some embodiments, the charging chips 226a, 226b, 228a, and 228b are positioned on the rear surface of the second board 132 facing the rear wall 105. The second board 132 may be configured to be removed and connected to the system 100. By being able to be removed and connected to the system 100, the second board 132 may be easily replaced when one or more electronic components on the second board 132 becomes defective. In other embodiments, the second board 132 may include several removably connected boards, in which the one or more removably connected boards may include various electronic components of the second board 132 and at least one of the charging chips 226a, 226b, 228a, and 228b, and 24V DC/4.8V DC power converter 214. For example, the second board 132 may include three removably connected boards, in which one removably connected board includes the charging chips 226a and 228a, another removably connected board includes the charging chips 226b and 228b, and a third removably connected board includes the 24V DC/4.8V DC power converter 214. The removably connected boards may be electrically coupled to one another, thereby forming the second board 132. The removably connected boards may be configured to be removed and connected to the system 100. By being able to be removed and connected to the system 100, a power converter may be easily replaced when the power converter becomes defective.

In one or more embodiments, the charging chips 226a, 226b, 228a, and 228b may be configured to thermally interface with the rear wall 105, such that heat generated by one or more of the charging chips 226a, 226b, 228a, and 228b is thermally conducted into the chassis 102, in particular a portion the rear wall 105 or all of the rear wall 105. In some examples, each charging chip 226a, 226b, 228a, and 228b may each produce up to 2.5 W of heat, thereby producing up to 10 W of output heat. In some embodiments, the 24V DC/4.8V DC power converter 214 is positioned on the front surface of the second board 132 facing the access cover 136. In some embodiments, the 24V DC/4.8V DC power converter 214 is configured to thermally interface with the volume of the chassis 102, that is, the space of the inner portion 129. The 24V DC/4.8V DC power converter 214 is the heat producing electrical component that has the lowest heat producing potential.

In one or more embodiments, the third board 134 includes the 24V DC/50V DC power converter 218 and the 24V DC/50V DC power converter 220. In some examples, the 24V DC/50V DC power converter 218 and the 24V DC/50V DC power converter 220 may each produce up to 3 W of heat. In some embodiments, the 24V DC/50V DC power converter 218 and the 24V DC/50V DC power converter 220 are positioned on a rear surface of the third board 134 facing either sidewall 107b. The third board 134 may be configured to be removed and connected to the system 100. By being able to be removed and connected to the system 100, the third board 134 may be easily replaced when one or more electronic components on the third board 134 becomes defective. In other embodiments, the third board 134 may include several removably connected boards, in which the one or more removably connected boards may include various electronic components of the third board 134 and at least one of the 24V DC/50V DC power converter 218 and the 24V DC/50V DC power converter 220. For example, the third board 134 may include two removably connected boards, in which one removably connected board includes the 24V DC/50V DC power converter 218, and in which the other removably connected board includes the 24V DC/50V DC power converter 220. The removably connected boards may be electrically coupled to one another, thereby forming the first board 130. The removably connected boards may be configured to be removed and connected to the system 100. By being able to be removed and connected to the system 100, a power converter may be easily replaced when the power converter becomes defective.

The 24V DC/50V DC power converter 218 and the 24V DC/50V DC power converter 220 may be configured to thermally interface with the sidewall 107b, such that heated generated by at least one of the 24V DC/50V DC power converter 218 and the 24V DC/50V DC power converter 220 is thermally conducted into the chassis 102, in particular the sidewall 107b. In some examples, the heat potential generated by the 24V DC/50V DC power converter 218 and the 24V DC/50V DC power converter 220 is less than the heat potential generated by the charging chips 226a, 226b, 228a, and 228b.

In one or more embodiments, the first board 130 is configured to receive DC power from an external power source. For the cases in which AC power is used as an input power source, an AC/DC adapter 202 externally converts the AC power to DC power before entering the chassis 102 at input FI10. The AC/DC adapter 202 may be, for example, a COTS AC/DC adapter. In some embodiments, the AC/DC adapter 202 is configured to convert the AC power into a converted 24V of DC power. For the cases in which DC power is used as an input power source, the first board 130 is configured to receive 10V-36V of DC power at input FI7. The 24V DC/24V DC power converter 204 of the first board 130 is configured to internally convert, at the first board 130, the 10V-36V of DC power to a converted 24V of DC power. In one or more embodiments, input 122 includes both FI10 and input FI7. For example, the terminal D38999/24WD97PN of input 122 may include 12 contacts, in which 8 contacts are 20 gauge and 4 contacts are 16 gauge. The 4 contacts at 16 gauge may be used for DC input power, and 4 contact at 20 gauge are used for input power from an AC/DC adapter. In one or more embodiments, the converted AC and DC power is provided to a 24V power bus configured to distribute and receive power from the second board 132 and the third board 134. In one or more embodiments, the converted AC and DC power can be used to charge the battery packs 124a and 124b, can provide power to the night sight 222, and/or can provide power to the MGS 224.

In one or more embodiments, the second board 132 is configured to receive at input SI3 a converted 24V of DC power from the first board 130 at output FI05. In some embodiments, the second board 132 is configured to use the converted 24V of DC power to charge at least one of the battery strings within battery pack 124a or 124b and to supply power to operate the night sight 222 and the MGS 224.

In some embodiments, the converted AC and DC power can be used to operate the night sight 222 and the MGS 224 without using power from the battery packs 124a and 124b. To operate the night sight 222 and the MGS 224 without using power from the battery packs 124a and 124b, a switch 211a is closed, thereby routing power to the night sight 222 and the MGS 224. In one or more embodiments, when the switch 108 is turned ON, switch 211a is closed.

Figure 3:
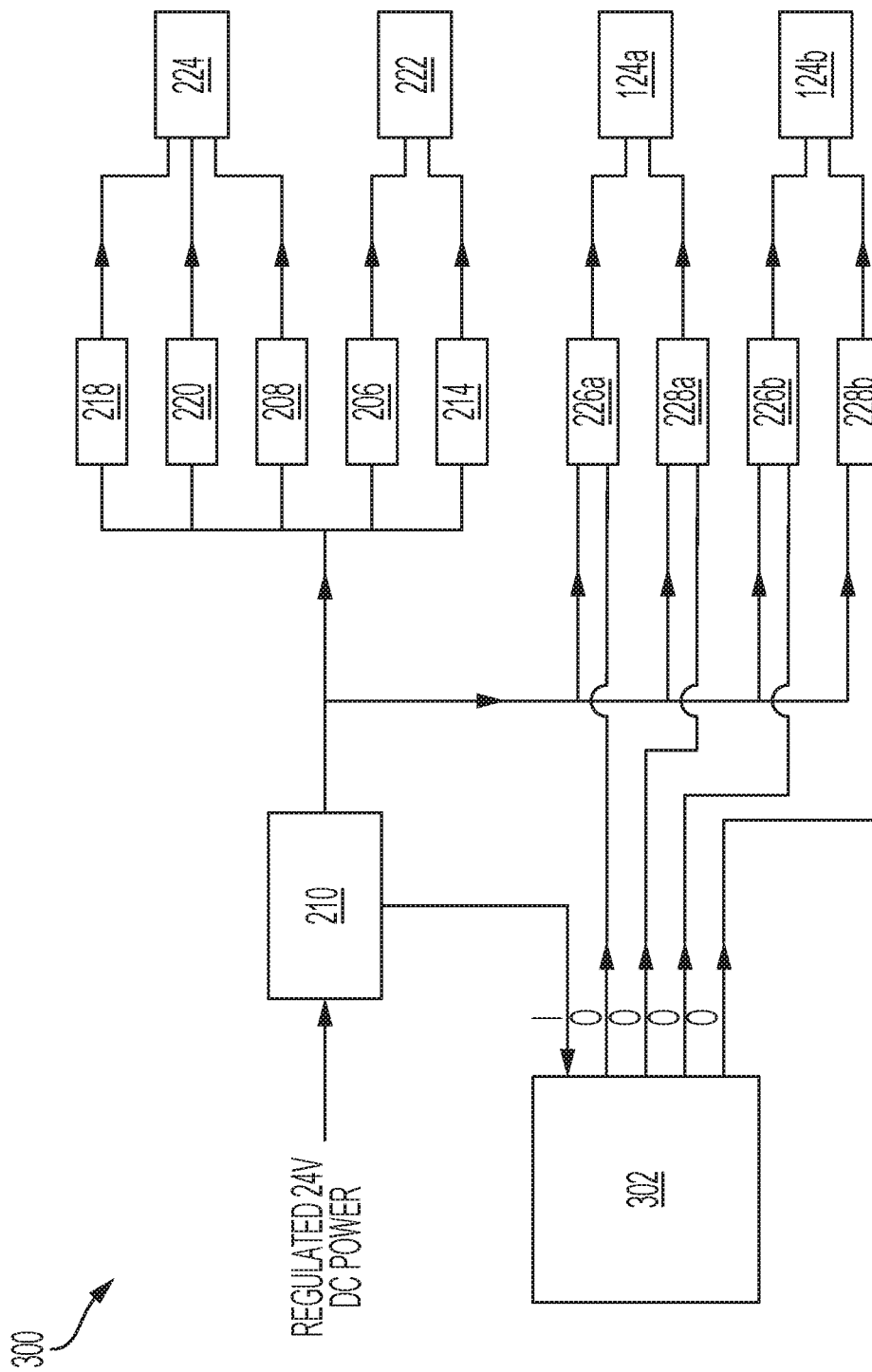
FIG. 3 illustrates a schematic of a current sensor of the interconnect diagram of FIG. 2.

For the cases in which switch 211a is closed, the second board 132 receives at input SI3 the converted 24V DC power from output FI05. The converted 24V DC power passes to a current sensor 210 provided on the second board 132. In one or more embodiments, current sensor 210 is provided to, for the cases in which the first board 130 receives input power at either FI10 or FI7, prevent the system 100 from charging the battery packs 124a and 124b at the same time as providing power to the night sight 222 and the MGS 224. FIG. 3 illustrates a schematic 300 of the current sensor 210 of the interconnect diagram 200 of FIG. 2, according to one or more embodiments of the present disclosure. When a missile is being fired, there may be cases in which the system 100 cannot provide power from an outside power source to both the night sight 222 and the MGS 224 and the battery cells 124a and 124b simultaneously. In some embodiments, the current sensor 210 is configured to sense the amount of power being output from the system 100. If the amount of power being output from the system 100 exceeds a threshold, then the current sensor 210 sends a signal I to a microcontroller 302 to disable charging the battery cells 124a and 124b for a duration of time corresponding to the length of time necessary to fire a missile. The microcontroller 302 sends a signal 0 to the charging chips 126a, 126b, 128a, and 128b to disable charging. In some embodiments, after a missile has been fired, the system 100 is configured to automatically start recharging the battery packs 124a and 124b. The microcontroller 302 may send a signal to the charging chips 126a, 126b, 128a, and 128b to enable charging. In some embodiments, the system 100 is configured to disable charging the battery cells 124a and 124b based on the duration of time from when a missile is fired to impact of the missile on a target.

In one or more embodiments, to provide the required power to the night sight 222, the first board is configured to provide 16.8V of DC power to the night sight 222, and the second board is configured to provide 4.8V of DC power to the night sight 222. From the current sensor 210, the converted 24V DC power passes to the 24V DC/16.8V DC power converter 206, the 24V DC/24V DC power converter 208, and the 24V DC/4.8V DC power converter 214. In some embodiments, the 24V DC/16.8V DC power converter 206 is configured to convert the converted 24V DC power, provided from the 24V DC/24V DC power converter 204 or the AC/DC adapter 202, to 16.8V of DC power. Thereafter, having converted the 24V converted DC power, the first board 130 provides 16.8V DC to the night sight 222. In some embodiments, the 24V DC/4.8V DC power converter 214 is configured to convert the converted 24V DC power, provided from the 24V DC/24V DC power converter 204 or the AC/DC adapter 202, to 4.8V of DC power. Thereafter, having converted the 24V converted DC power, the second board 132 provides 4.8 VDC to the night sight 222.

In one or more embodiments, to provide the required power to the MGS 224, the first board 130 is configured to provide, in conjunction with the capacitor circuit 216 provided on the second board 132, 24V of DC power to the MGS 224; and the second board 132 is configured to provide the converted 24V of DC power to the 24V DC/50V DC power converter 218 and the 24V DC/50V DC power converter 220 provided on the third board 134, in which the third board 134 is configured to provide plus 50V and minus 50V of DC power to the MGS 224.

From the current sensor 210, the converted 24V DC power passes from the second board 132 to the 24V DC/50V DC power converter 218 and the 24V DC/50V DC power converter 220 provided on the third board 134. In some embodiments, the 24V DC/50V DC power converter 218 is configured to convert the converted 24V DC power, provided from the 24V DC/24V DC power converter 204 or the AC/DC adapter 202, to 50V of DC power. Thereafter, having converted the 24V converted DC power, the third board 134 provides 50 VDC to the MGS 224. In some embodiments, the 24V DC/50V DC power converter 220 is configured to convert the converted 24V DC power, provided from the 24V DC/24V DC power converter 204 or the AC/DC adapter 202, to 50V of DC power. Thereafter, having converted the 24V converted DC power, the third board 134 provides 50 VDC to the MGS 224.

From the current sensor 210, the converted 24V DC power passes from the second board 132 to the 24V DC/24V DC power converter 208 provided on the first board 130. In one or more embodiments, the 24V DC/24V DC power converter 208 can be a switching regulator and/or a 24V DC/24V DC power converter. The 24V DC/24V DC power converter 208 may require, for example, 20-40 seconds of output time having a running current at 2.6 A+/−5% and three 105 millisecond maximum duration pulses. That is, the 24V DC/24V DC power converter 208 may operate for about 20-40 seconds while a missile is being fired. During the first pulse, there is, for example, a 14 A current spike. At or about 1.5 seconds after the first pulse, a second current spike, for example, occurs at 11 A. A third spike, for example, occurs at 11 A after the second current spike. It should be noted that that 24V DC/24V power converted 208 may run current at different amperages and different durations of maximum duration pulses to accommodate duration output times that are shorter and/or longer in duration than 20-40 seconds. For the cases in which, the 24V DC/24V DC power converter 208 cannot accommodate the short duration, high current transient spikes required by a MGS during a missile fire sequence, the capacitor circuit 216 may be configured to store the power required by the MGS and rapidly discharge and restore the power for follow-on sequences. In some embodiments, to increase the current of the power provided by the 24V DC/24V DC power converter 208, the 24V DC/24V DC power converter 208 is configured to initially provide the generated power to the capacitor circuit 216 in order to increase the high current at 24V as required by the MGS 224. The high current may be, for example, 14 A spikes at 105 milliseconds, in which the spikes are no greater than 1.5 seconds apart.

Figure 4:
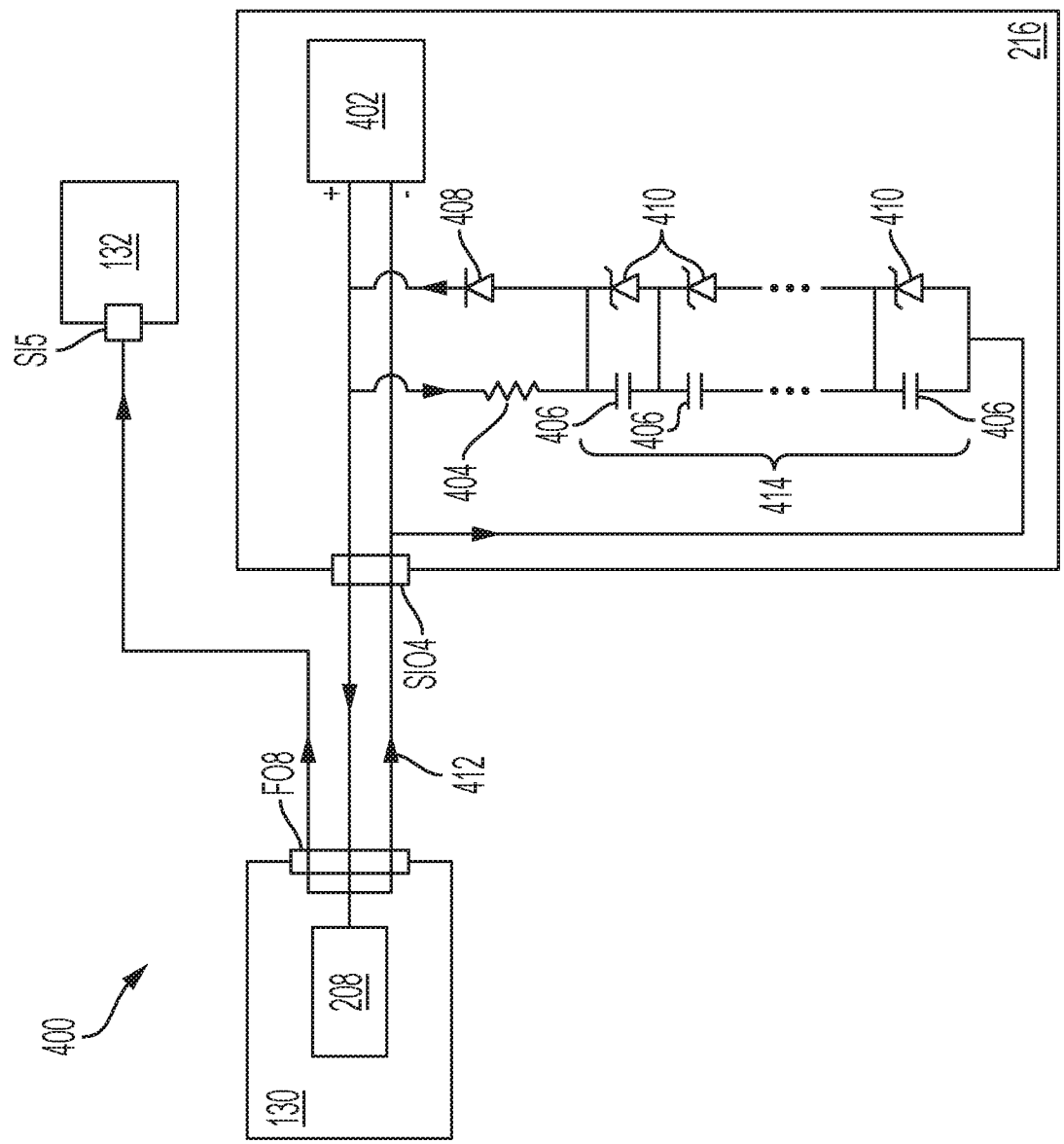
FIG. 4 illustrates a schematic of a voltage converter and a capacitor circuit of the interconnect diagram of FIG. 2.

FIG. 4 illustrates a schematic 400 of the 24V DC/24V DC power converter 208 and the capacitor circuit 216 of the interconnect diagram 200 of FIG. 2, according to one or more embodiments of the present disclosure. In one or more embodiments, the initial output 412 of the 24V DC/24V DC power converter is provided to the capacitor circuit 216. The capacitor circuit 216 may include a current limiting resistor 404, capacitors 406, Zener diodes 410, and a power diode 408. In some embodiments, the current limiting resistor 404 is configured to prevent the 24V DC/24V DC power converter 208 from overloading during charging of the capacitor bank 414. In one or more embodiments, the capacitors 406 each have an upper voltage limit of 2.7 to 3 volts and an electrical capacitance sufficient to provide the required transient currents. In some examples, ten 15 Farad capacitors 406 may be configured in series to one another. In one or more embodiments, the Zener diodes 410 are configured to protect against overvoltage in cases where the capacitance of the capacitors 406 are different.

At the capacitor circuit 216, the initial output 412 passes to a current limiting resistor 404. As the capacitors 406 charge, the current passing through the current limiting resistor 404 reduces to at or about zero current. When the current is reduced to at or near zero, the capacitor bank 414 is charged. For the cases in which the capacitor bank 414 is charging, the current flows from the 24V DC/24V DC power converter 208 to the capacitor circuit 216.

In cases in which the capacitance of the capacitors 406 in the capacitor bank are the same, each capacitor 406 charges to at or about 2.4V DC, thereby outputting 24V DC back to the 24V DC/24V DC power converter 208. Thereafter, the 24V DC/24V DC power converter 208 passes the power having a converted 24V DC power to the MGS 224. In some embodiments, the second board 132 includes an area to route heavier gauge wiring through the second board 132 at input SI5 and output SO7 to the MGS 224. The heavier gauge wiring may be used to supply the converted 24V DC power from the 24V DC/24V DC power converter 208 to the MGS 224.

In cases in which the capacitance of a capacitor 406 is smaller than the capacitance of other capacitors 406 in the capacitor bank 414, the voltage may increase more quickly than the other capacitors 406, thereby creating risk of damaging the capacitor 406 if the voltage exceeds the upper limit of 2.7V DC. When the voltage of the capacitor 406 nears the upper limit, current flows through the parallel Zener diode 410, thereby limiting the capacitor 406 to 2.7V DC while still allowing current to flow to the remaining capacitors 406 in the capacitor bank 414.

In some embodiments, a high transient load 402 is configured to draw power. In one or more embodiments, when the high transient load 402 draws power, the 24V DC/24V DC power converter 208 decreases the output voltage, and the power diode 408 begins to conduct based on the capacitor voltage of the capacitor bank 414 being high than the output voltage. In some embodiments, power diode 408 is configured to maintain the output voltage of the capacitor bank 414 flowing through the power diode 408 at or about 24V DC. Thus, in some embodiments, the current of the capacitor bank 414 does not flow until the output voltage drops to at or about 23.5V DC.

In some embodiments, when the output voltage decreases to 23.5V DC, the capacitor bank 414 is configured to discharge, based on transient duration to a lower voltage. For the cases in which the capacitor bank 414 is discharged, that is, during the discharge transient, the current flows from the capacitor circuit 216 to the 24V DC/24V DC power converter 208 via the power diode 408. Thereafter, the capacitor bank 414 is configured to recharge when the transient duration is complete.

For the cases in which input power at either FI10 or FI7 is not available, switch 211b is closed, thereby routing power from battery cells 124a and 124b to the night sight 222 and the MGS 224. In one or more embodiments, a microcontroller can be used to open and close switches 211a and 211b. In some embodiments, when the switch 108 is turned ON, a signal is sent to the microcontroller instruction the microcontroller to close switch 211a and open switch 211b. In some embodiments, when the switch 108 is turned OFF, a signal is sent to the microcontroller instruction the microcontroller to open switch 211a and close switch 211b. In one or more embodiments, when switch 211b is closed, battery packs 124a and 124b are configured to provide the required power to the night sight 222 and the MGS 224. In one or more embodiments, the power flows from battery packs 124a and 124b to the 24V DC/4.8V DC power converter 214, 24V DC/16.8V DC power converter, and thereafter to the night sight 222 in a similar manner as the AC or DC power supplied from an outside source after said power passes current sensor 210. In one or more embodiments, the power flows from battery packs 124a and 124b to the 24V DC/24V DC power converter 208, the capacitor circuit, and thereafter to the MGS 224 and to the 24V DC/50V DC power converter 218 and the 24V DC/50V DC power converter 220, and thereafter to the MGS 224 in a similar manner as the AC or DC power supplied from an outside source after said power passes current sensor 210.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A power system comprising:
   a chassis configured to house a first board, a second board, and a third board, the first board, the second board, and the third board being electrically coupled to one another, wherein:
   the first board is configured to receive power and to output power at a first voltage and a second voltage;
   the second board is configured to receive power from the first board or at least one internal battery electrically coupled to the second board and to output power using at least two voltages;
   the third board is configured to receive power from the second board and to output power at two voltages;
   each of the first board, the second board, and the third board includes one or more converters configured to convert the received power into the respective output power; and
   the one or more converters are thermally interfaced with one or more portions of the chassis so as to conduct heat into a respective portion of the chassis.

2. The power system of claim 1, wherein the first board is further configured to receive the power from either an alternating current power source or a direct current power source.

3. The power system of claim 1, wherein the first board includes a first converter configured to convert voltage of input power received from an outside power source, and a second converter and a third converter configured to convert voltage of power received from the second board,
 wherein the second converter is configured to output power at the first voltage, and
 wherein the third converter is configured to output power at the second voltage.

4. The power system of claim 3, wherein the second converter is configured to output power at the first voltage to a night sight.

5. The power system of claim 3, wherein the third converter is configured to output power at the second voltage to a missile guidance set.

6. The power system of claim 3, wherein the third converter is electrically coupled to a capacitor circuit configured to increase current of the output power provided at the second voltage.

7. The power system of claim 3, wherein the first converter, the second converter, and the third converter are positioned on a surface of the first board facing an upper wall of the chassis.

8. The power system of claim 7, wherein the first converter, the second converter, and the third converter are thermally interfaced with at least one of a portion of the upper wall of the chassis and a heat sink of the upper wall.

9. The power system of claim 8, wherein the heat sink is configured to thermally conduct and convect heat from at least one of the first converter, the second converter, and the third converter to an outside environment.

10. The power system of claim 3, wherein the first converter, the second converter, and the third converter each has a highest heat producing potential among the converters provided on the first board, the second board, and the third board.

11. The power system of claim 1, wherein the second board includes at least one charging chip configured to charge the at least one internal battery and to supply output power to at least one night sight or missile guidance set.

12. The power system of claim 11, wherein the at least one charging chip is positioned on a surface of the second board facing a rear wall of the chassis, the at least one charging chip being thermally interfaced with the rear wall, and
 wherein a portion of the rear wall is configured to thermally conduct heat from the at least one charging chip.

13. The power system of claim 1, wherein the second board includes a fourth converter positioned on a surface of the second board facing an interior portion of the chassis.

14. The power system of claim 13, wherein the fourth converter is configured to convert voltage of power received from the first board.

15. The power system of claim 13, wherein the fourth converter is configured to be thermally interfaced with a volume of the interior portion of the chassis, such that the fourth converter is configured to conduct heat into the volume of the interior portion of the chassis.

16. The power system of claim 13, wherein the fourth converter has a lowest heat producing potential among the converters provided on the first board, the second board, and the third board.

17. The power system of claim 1, wherein the second board includes a current sensor circuit configured to prevent charging of the at least one internal battery while the first board, the second board, and the third board are outputting power.

18. The power system of claim 1, wherein the third board includes a fifth converter and a sixth converter, each being configured to convert voltage of power received from the second board.

19. The power system of claim 18, wherein the fifth converter and the sixth converter are positioned on a surface of the third board facing a side wall of the chassis.

20. The power system of claim 18, wherein the fifth converter and the sixth converter are configured to be thermally interfaced with a side wall of the chassis, and
 wherein the side wall of the chassis is configured to thermally conduct heat from the fifth converter and the sixth converter.

21. A power system comprising:
 a chassis configured to house a first board and a second board, the first board and the second board being electrically coupled to one another, wherein:
  the first board is configured to receive input power and to output power at a first voltage and a second voltage; and
  the second board is configured to receive power from the first board or at least one internal battery electrically coupled to the second board and to output power using at least two voltages;
  each of the first board and the second board includes one or more converters configured to convert the received power into the respective output power; and
  the one or more converters are thermally interfaced with one or more portions of the chassis so as to conduct heat into a respective portion of the chassis.

22. The power system of claim 21, wherein the chassis is further configured to house a third board being electrically coupled to the first board and the second board,
 wherein the third board is configured to receive power from the second board and to output power at two voltages, and
 wherein the third board includes at least one converter configured to convert the power received from the second board.

23. The power system of claim 22, wherein the at least one converter of the third board is configured to thermally interface with the one or more portions of the chassis.

* * * * *